July 22, 1941.     P. M. HEINMILLER     2,250,019
SPRING SUSPENSION FOR VEHICLE WHEELS
Filed July 30, 1940
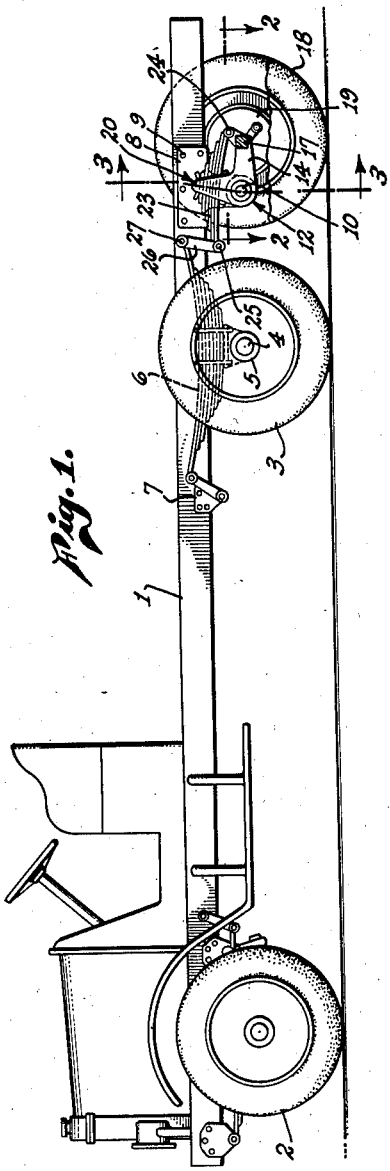
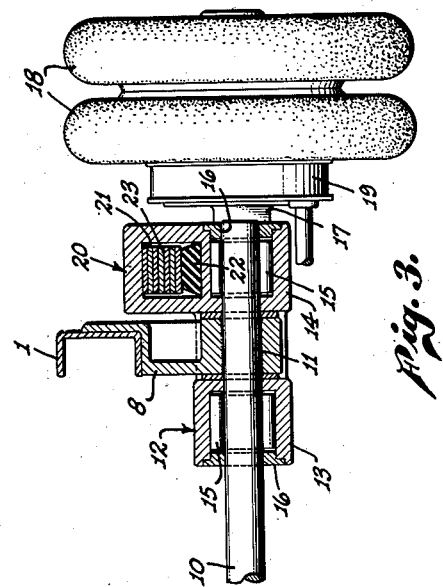
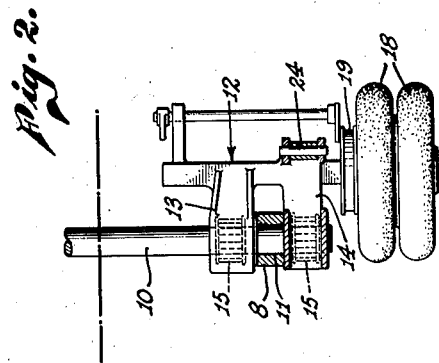
Inventor
PERCIVAL M. HEINMILLER,
By Lyon & Lyon
Attorney Patented July 22, 1941

2,250,019

UNITED STATES PATENT OFFICE 2,250,019

SPRING SUSPENSION FOR VEHICLE WHEELS

Percival M. Heinmiller, Los Angeles, Calif., assignor to Utility Trailer Manufacturing Company, Los Angeles, Calif., a corporation of California Application July 30, 1940, Serial No. 348,457

10 Claims. (Cl. 280—124)

This invention relates to the running gears of motor vehicles, and more particularly to spring suspensions by means of which a plurality of wheels may be attached to such vehicles.

This invention is an improvement over that disclosed in the prior patents to J. R. Junkin, Patent No. 1,757,758, and D. L. Van Leuven, Patent No. 1,757,759.

In providing an attachment for motor vehicles for the suspension of auxiliary pairs of wheels adapted to sustain a portion of the load ordinarily borne by the rear wheels, certain difficulties have been encountered in meeting the problems of wheel alignment maintenance, bearing the various stresses of braking torque, side thrusts, etc.

It has been proposed to utilize a cast steel rocker arm and thereby obtain strength and rigidity. It has alternatively been proposed to utilize a spring rocker arm for shock absorbing purposes.

It is one of the objects of this invention to provide a running gear for motor vehicles of the type described, which combines the advantages of a cast steel rocker arm and a spring rocker arm.

It is another object of this invention to provide an attachment of the type described, in which provision is made upon the U-shaped rocker arm for bearings upon both sides of the bracket by which it is connected to the frame of the vehicle, thus adding strength and insuring proper alignment.

It is another object of this invention to provide a spring suspension mounted to rotate with the rocker arm as a unit.

It is another object of the invention to provide a loose or resilient mounting for the spring suspension at its midpoint, allowing full use of the shock absorbing qualities of the entire length of the said spring.

Other objects and advantages appear hereinafter.

In the accompanying drawing:

Fig. 1 is a side elevation of a motor vehicle chassis illustrating a running gear embodying this invention.

Fig. 2 is a section taken on the line 2—2 of Fig. 1.

Fig. 3 is a section taken on the line 3—3 of Fig. 1.

Referring more particularly to the drawing, I have shown a motor vehicle chassis having a frame 1, which may be of any suitable or desirable design or construction. A pair of front wheels 2 are provided in the conventional manner. A pair of drive wheels 3 are provided upon axle 4, which axle is secured in housing 5. Housing 5 is secured to springs 6 by means of which the wheels 3 are suspended from frame 1.

The forward end of the springs 6 is secured to the frame 1 by any suitable means 7, while the rearward end of the springs 6 is free.

A bracket 8 is securely attached to the frame 1 as by means of bolts 9. Said bracket 8 carries and is securely affixed to a shaft 10, as by weldings at 11. Said shaft 10 extends transversely of the frame 1 and is similarly secured to the second bracket 8 of second auxiliary wheel. It will be understood that a second auxiliary wheel identical with and mounted similarly to the one shown in Figure 1 is provided. Mounted for oscillation about the shaft 10 is a U-shaped rocker arm 12. The two arms 13 and 14 of said rocker arm carry roller bearings 15 for antifriction bearing upon the shaft 10. The roller bearings 15 are secured in the arms 13 and 14 by bearing retainers 16. The arm 14 of the rocker arm 12 carries a stub spindle 17 upon which is mounted the wheel or wheels 18. A brake 19 may also be mounted upon said stub spindle 17.

Formed upon and integral with the arm 14 of rocker arm 12 is a spring mounting 20. Said spring mounting 20 has an aperture 21 therethrough on the bottom of which is a resilient block of rubber 22.

A laminated spring 23 is secured at one end to the arm 14, as at 24 and passes through the aperture 21, being held in contact with the upper wall thereof by the rubber block 22.

The other end of spring 23 is secured, as at 25 to spring shackle 26. To the upper end of spring shackle 26 is secured the free end of spring 6, as at 27.

It will be readily appreciated that instead of the stub spindle 17, the rocker arm may carry a through axle completely transversing the frame 1 and having its far end secured in the rocker arm of the far wheel. In case such a through axle is used a universal joint like that disclosed in the G. L. Knox Patent 1,928,900 may be interposed between the through axle and the rocker arm 12.

It will be apparent from the above description that the laminated spring 23 is mounted to rotate or oscillate with the rocker arm 12 and that, by reason of the resilient rubber block 22, any thrust downward upon the shackle 26 will be cushioned by the cushioning effect of the entire spring 23, and not merely by the half of said spring which would remain effective were said spring 23 positively held in aperture 21.

It will also be apparent that by providing a rocker arm 12, which is preferably constructed of cast steel, a rigid and sturdy construction is obtained. At the same time the provision of laminated spring 23, with its resilient cushion 22 assures the absorption of all road shocks.

It is particularly to be noted that each arm 13 and 14 of rocker arm 12, being provided with roller bearings 15, assures proper and dependable alignment of the stub spindle.

While the particular forms of the invention herein described are well adapted to carry out the objects of the invention, it is to be understood that various modifications and changes may be made without departing from the principles of the invention, and the invention includes all such modifications and changes as come within the scope of the appended claims.

I claim:

1. In a multi-wheel attachment for motor vehicles the combination of a frame, a hanger bracket secured to said frame, a shaft secured to said bracket transversely of said frame, a rocker arm mounted upon said shaft, a spring mounting formed upon said rocker arm intermediate the ends of a laminated spring, a laminated spring, loosely supported in said mounting, means for securing one end of said laminated spring to said rocker arm, means for securing the other end of said spring to the rear spring of the motor vehicle, a stub spindle upon said rocker arm, and a wheel mounted upon said stub spindle.

2. In a multi-wheel attachment for motor vehicles the combination of a frame, a hanger bracket secured to said frame, a shaft secured to said bracket transversely of said frame, a U-shaped rocker arm, roller bearings in each arm of said U-shaped rocker arm, one on each side of said bracket, for securing said rocker arm to said shaft, a spring mounting formed upon said rocker arm intermediate the ends of a laminated spring, a laminated spring loosely supported in said mounting, means for securing one end of said laminated spring to said rocker arm, means for securing the other end of said spring to the rear spring of the motor vehicle, a stub spindle upon said rocker arm, and a wheel mounted upon said stub spindle.

3. In a multi-wheel attachment for motor vehicles the combination of a frame, a hanger bracket secured to said frame, a shaft secured to said bracket transversely of said frame, a U-shaped rocked arm mounted upon said shaft, a laminated spring loosely supported in a spring mounting, said spring mounting formed upon said rocker arm and providing a rest for said spring adjacent the pivot point of said rocker arm, means for securing one end of said laminated spring to said rocker arm, means for securing the other end of said spring to the rear spring of the motor vehicle, a stub spindle upon said rocker arm, and a wheel mounted upon said stub spindle.

4. In a six wheel attachment for motor vehicles the combination of a frame, a hanger bracket secured to said frame, a shaft secured to said bracket transversely of said frame, a U-shaped rocker arm mounted upon said shaft, a laminated spring, a spring mounting formed upon said rocker arm intermediate the ends of said laminated spring having an aperture therein for the passage of said laminated spring, a rubber cushion in said spring mounting providing a yielding rest for said spring in said aperture, means for securing one end of said laminated spring to said rocker arm, means for securing the other end of said spring to the rear spring of the motor vehicle, a stub spindle upon said rocker arm, and a wheel mounted upon said stub spindle.

5. In a multi-wheel attachment for motor vehicles the combination of a frame, a hanger bracket secured to said frame, a shaft secured to said bracket transversely of said frame, a U-shaped rocker arm, roller bearings in each arm of said U-shaped rocker arm, one on each side of said bracket, for securing said rocker arm to said shaft, a laminated spring, a spring mounting formed upon said rocker arm adjacent the pivot point of said rocker arm and having an aperture therein for the passage of said laminated spring, a rubber cushion in said spring mounting providing a yielding rest for said spring in said aperture, means for securing one end of said laminated spring to said rocker arm, means for securing the other end of said spring to the rear spring of the motor vehicle, a stub spindle upon said rocker arm, and a wheel mounted upon said stub spindle.

6. In a multi-wheel attachment for motor vehicles the combination of a frame, a hanger bracket secured to said frame, a shaft secured to said bracket transversely of said frame, a rocker arm mounted upon said shaft, a spring mounting formed upon said rocker arm intermediate the ends of a laminated spring, a laminated spring loosely supported in said spring mounting, means for securing one end of said laminated spring to said rocker arm, means for securing the other end of said spring to the rear spring of the motor vehicle, an axle mounted upon said rocker arm and disposed transversely of said frame, and a wheel mounted upon said axle.

7. In a multi-wheel attachment for motor vehicles the combination of a frame, a hanger bracket secured to said frame, a shaft secured to said bracket transversely of said frame, a U-shaped rocker arm mounted upon said shaft, a laminated spring, a spring mounting formed upon said rocker arm intermediate the ends of said laminated spring and having an enlarged aperture therein for the free passage of said laminated spring, a rubber cushion in said spring mounting yieldably resisting freedom of movement of said spring in said enlarged aperture, means for securing one end of said laminated spring to said rocker arm, means for securing the other end of said spring to the rear spring of the motor vehicle, an axle mounted upon said rocker arm and disposed transversely of said frame, and a wheel mounted upon said axle.

8. In a multi-wheel attachment for motor vehicles, the combination of a frame, a hanger bracket secured to said frame, a shaft secured to said bracket transversely of said frame, a rocker arm mounted upon said shaft, a spring mounting formed upon said rocker arm intermediate the ends of a laminated spring, a laminated spring loosely supported in said mounting, means for securing one end of said laminated spring to a rocker arm, means for securing the other end of said spring to the motor vehicle, a rubber rebound cushion in said spring mounting upon which said spring rests, a stub spindle upon said rocker arm, and a wheel mounted upon said stub spindle.

9. In a multi-wheel attachment for motor vehicles, the combination of a frame, a hanger bracket secured to said frame, a shaft secured to said bracket transversely of said frame, a U-shaped rocker arm, roller bearings in each arm of said U-shaped rocker arm, one on each side of said bracket, for securing said rocker arm to said shaft, a spring mounting formed upon said rocker arm intermediate the ends of a laminated spring, a laminated spring loosely supported in said mounting, means for securing one end of said laminated spring to said rocker arm, means for securing the other end of said spring to the rear spring of the motor vehicle, a rubber cushion in said spring mounting yieldably resisting freedom of movement of said laminated spring in said mounting, a stub spindle upon said rocker arm, and a wheel mounted upon said stub spindle.

10. In a multi-wheel attachment for motor vehicles, the combination of a frame, a hanger bracket secured to said frame, a shaft secured to said bracket transversely of said frame, a rocker arm mounted upon said shaft, a spring mounting formed upon said rocker arm intermediate the ends of a laminated spring, a laminated spring loosely supported in said mounting, means for securing one end of said laminated spring to said rocker arm, means for securing the other end of said spring to the rear spring of the motor vehicle, a rubber cushion in said spring mounting providing a yielding rest for said laminated spring, an axle mounted upon said rocker arm and disposed transversely of said frame, and a wheel mounted upon said axle.

PERCIVAL M. HEINMILLER.